US008741108B2

(12) United States Patent
Dinnematin

(10) Patent No.: US 8,741,108 B2
(45) Date of Patent: Jun. 3, 2014

(54) PROCESS AND REACTOR FOR THE PYROLYSIS OF CARBON-CONTAINING WASTE MATERIAL

(75) Inventor: John Lindsay Dinnematin, Franschhaek (ZA)

(73) Assignee: Gecco Group (Proprietary) Limited, Hermanus (ZA)

( * ) Notice: Subject to any disclaimer, the term of this patent is extended or adjusted under 35 U.S.C. 154(b) by 1794 days.

(21) Appl. No.: 11/989,982

(22) PCT Filed: Aug. 3, 2006

(86) PCT No.: PCT/IB2006/002121
§ 371 (c)(1),
(2), (4) Date: May 18, 2010

(87) PCT Pub. No.: WO2007/015158
PCT Pub. Date: Feb. 8, 2007

(65) Prior Publication Data
US 2010/0276271 A1    Nov. 4, 2010

(30) Foreign Application Priority Data

Aug. 3, 2005   (ZA) .................................. 2005/06208

(51) Int. Cl.
C10B 47/40    (2006.01)
C10B 53/07    (2006.01)
C10B 1/06     (2006.01)

(52) U.S. Cl.
USPC ............... 201/32; 201/25; 202/117; 202/223; 202/260

(58) Field of Classification Search
USPC ......... 202/117, 109, 110, 222, 223, 243, 260, 202/265; 201/32, 25, 35, 41, 45, 30
See application file for complete search history.

(56) References Cited

U.S. PATENT DOCUMENTS 612,181 A * 10/1898 Spurrier ........................ 202/118
2,335,611 A * 11/1943 Pray ............................. 202/117

(Continued)

FOREIGN PATENT DOCUMENTS

DE        1144683       7/1963
WO     WO 98/34996       8/1998

OTHER PUBLICATIONS

Roy, C. et al., "Vacuum pyrolysis of Used Tires and-Uses for Oil and Carbon Black Products", Journal of Analytical and Applied Pyrolysis, vol. 51, No. 1, 1999, p. 201-221, XP002405495 Elsevier Science Publishers B.V., Amsterdam, Netherlands.

*Primary Examiner* — Jill Warden
*Assistant Examiner* — Joye L Woodard
(74) *Attorney, Agent, or Firm* — McDermott Will & Emery LLP

(57) ABSTRACT

A reactor (9) for the pyrolysis of carbon-containing waste material such as rubber chips includes a cylindrical air-tight reactor vessel (10) which has an inlet through which rubber chips (4) are introduced into the reactor vessel and an outlet (60) through which oil distillate can be discharged therefrom. The reactor vessel has a cooling jacket through which cooling water flows for cooling an inner shell (40) of the vessel. The chips (4) are deposited onto a support tray (70) and displaced towards a rear end of the reactor vessel by a chain conveyer (89). The chips (4) are heated on the tray (40) causing decomposition of the chips into a vapor and amorphous carbon. The vapor condenses when it contacts the inner shell (40) and runs down the sides of the vessel (10) towards a lower side thereof before being discharged through the outlet (60).

18 Claims, 7 Drawing Sheets

(56) References Cited

U.S. PATENT DOCUMENTS 3,691,019 A * 9/1972 Brimhall .................... 202/118
4,781,796 A * 11/1988 Bridle et al. ................. 202/117

* cited by examiner

PROCESS AND REACTOR FOR THE PYROLYSIS OF CARBON-CONTAINING WASTE MATERIAL

FIELD OF INVENTION

THIS INVENTION relates to a process and a reactor for the pyrolysis of carbon-containing waste material.

BACKGROUND TO THE INVENTION

Effective processing of carbon-containing waste material such as plastics, rubber and oil sludge has become a major environmental problem.

The incineration of waste material containing carbon, particularly plastics and rubber, leads to environmental pollution, whereas dumping of such unrecycled waste material in dump sites is not sustainable.

It is an object of this invention to provide a process and reactor for the pyrolysis of carbon-containing waste material. It is also an object of this invention to recover commercially valuable oil and amorphous carbon from waste materials containing carbon, such as oil sludge, plastics and rubber.

According to a first aspect of the invention there is provided a reactor for the pyrolysis of carbon-containing waste material, which includes:
a reactor vessel defining an air-tight reactor chamber, the reactor vessel having inlet means through which waste material can be introduced into the reactor chamber to be heat treated and outlet means for discharging heat treated material from the reactor chamber;
a support tray that is disposed horizontally within the reactor chamber between the inlet means and the outlet means and that has a support surface for supporting a bed of the waste material;
heating means for heating the bed of waste material on the support surface of the support tray, to a temperature sufficient to cause decomposition of the waste material into a gaseous product and a solid residue;
a conveyor system for moving the bed of waste material along the support tray;
vacuum means for forming a vacuum within the reactor chamber; and
cooling means for cooling at least part of the reactor vessel thereby to provide for condensation of a portion of the gaseous product when it contacts the reactor vessel.

The cooling means may be in the form of a cooling jacket which surrounds at least part of the reactor vessel and in which a cooling medium, such as water, can flow, for cooling the reactor vessel.

The reactor vessel may have a first end wall structure at a first end of the vessel, a second end wall structure at a second end thereof and a cylindrical wall structure extending between said first and second ends.

The cylindrical wall structure of the reactor vessel may include an inner shell and an outer shell spaced therefrom, with the cooling jacket being defined between the inner and outer shells.

The first and second end wall structures may include spaced inner and outer shells, with additional cooling jackets being defined between the inner and outer shells.

The support tray may be disposed centrally within the reactor vessel, extending between the first and second ends of the reactor vessel.

The reactor vessel may include deflector means which is disposed above the support tray for deflecting the gaseous product towards sides of the reactor vessel, thereby to prevent droplets of condensed gaseous product from falling back onto the support tray.

The deflector means may be in the form of a deflector plate which is shaped to deflect the gaseous product towards sides of the reactor vessel.

The deflector plate may be spaced from and located above the support tray.

The heating means may be in the form of a furnace which is disposed externally of the reactor vessel and a heat exchanger in the form of a heating conduit for conveying air heated by the furnace, into the reactor vessel, the conduit extending for the length of the reactor vessel for heating the support tray and thereby the waste material supported thereon, via heat transfer to the support tray.

The conduit may follow a return path wherein the conduit extends from the furnace into the reactor vessel and substantially for the length of the support tray before returning to the furnace where reheating of the air takes place, in use.

The conveyor system may include a plurality of horizontally-spaced rake members which extend across the support surface of the support tray, the conveyor system being operable to displace the rake members along the support surface in a direction from the first end of the reactor vessel to the second end thereof, thereby to displace the particulate material along the support surface.

The rake members may be configured to alter the orientation of the waste material while displacing the waste material along the support tray, thereby to expose different surfaces of the waste material to heat so as to increase the rate of heat transfer to the waste material.

The reactor vessel may be adapted for processing hydrocarbon-containing waste material, the outlet means of the reactor vessel including an oil distillate opening through which condensed oil resulting from the pyrolysis of the waste material, can be discharged from the reactor vessel; and a solid residue outlet through which the solid residue can be discharged from the reactor vessel.

The reactor may include a solid residue screw-conveyor which has a first end located within the reactor vessel and a second end disposed externally of the reactor vessel, for conveying solid residue from the reactor vessel to a receiving bin.

The vacuum means may be in the form of a vacuum pump which is connected via a vacuum conduit, to the reactor vessel for reducing the air pressure within the reactor vessel to sub-atmospheric pressures.

The reactor may include a screw-conveyor for conveying waste material into the reactor vessel via its inlet means, the screw-conveyor extending into the reactor vessel for depositing particulate waste material onto the support tray near the first end of the vessel.

The invention extends to the reactor vessel as described and defined hereinabove.

According to a second aspect of the invention there is provided a process for the pyrolysis of carbon-containing waste material using the reactor in accordance with the first aspect of the invention, the process including:
introducing waste material into the reactor vessel of the reactor via the inlet means thereof;
heating the support tray and thereby the waste material to a temperature sufficient to cause decomposition of the waste material into a gaseous product and a solid residue;
displacing the waste material along the support tray from the inlet means to the outlet means of the reactor vessel;
cooling at least a portion of the reactor vessel thereby to allow for condensation of the gaseous product as it contacts said portion of the reactor vessel; and collecting the resultant condensate and the solid residue.

The process may be adapted for use in processing hydrocarbon-containing waste material.

The process may include allowing the condensed oil distillate to run along a side of the reactor vessel within the reactor chamber, to a position within the reactor chamber where the oil distillate can be collected and discharged from the reactor vessel.

The process may include deflecting the gaseous product from a position above the support tray towards the side of the reactor vessel thereby to prevent droplets of condensed oil distillate from falling back onto the support tray.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DESCRIPTION OF PREFERRED EMBODIMENT

Figure 1:
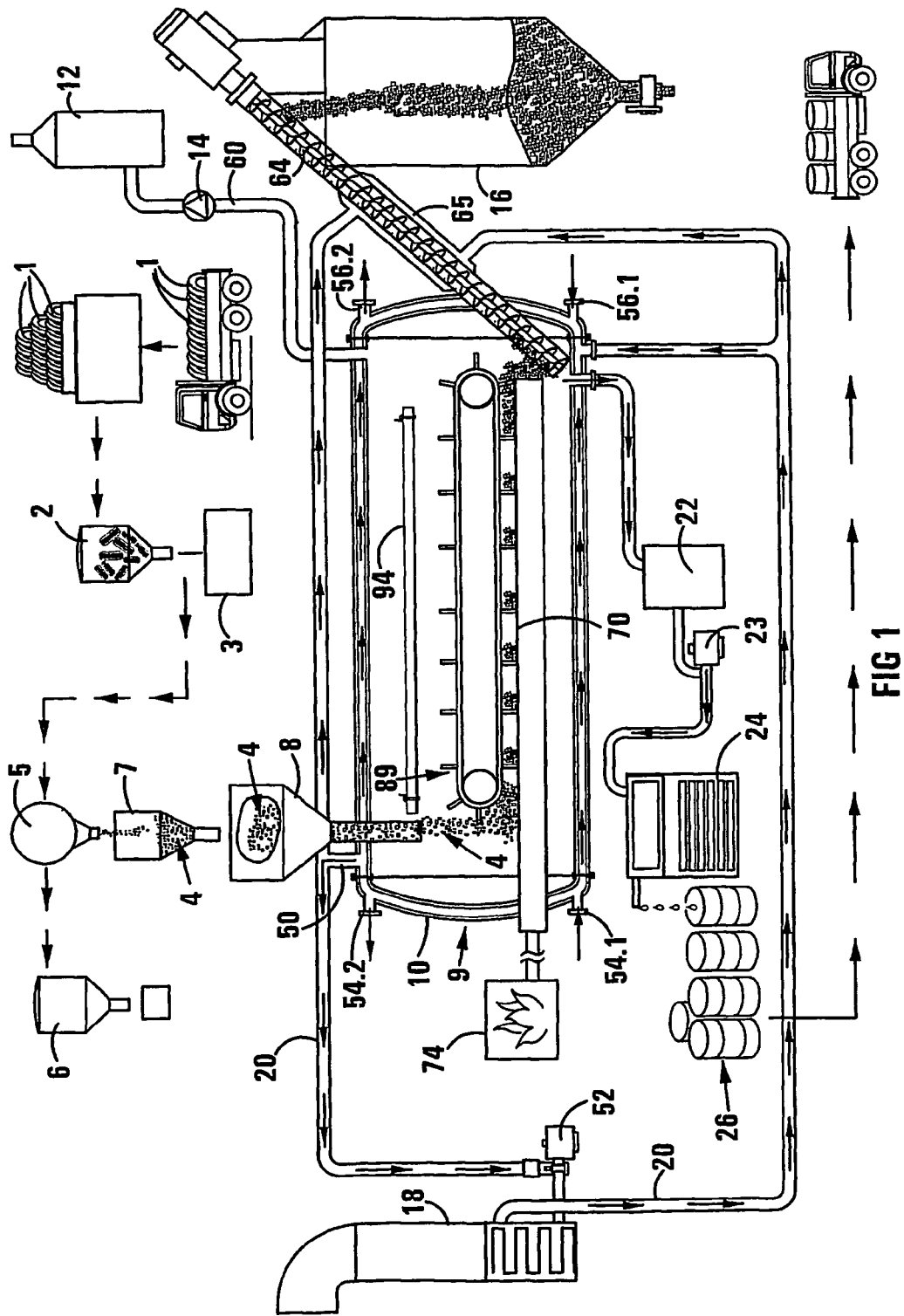
FIG. 1 shows a schematic layout of a process in accordance with the invention, for the pyrolysis of rubber tyres.
Figure 2:
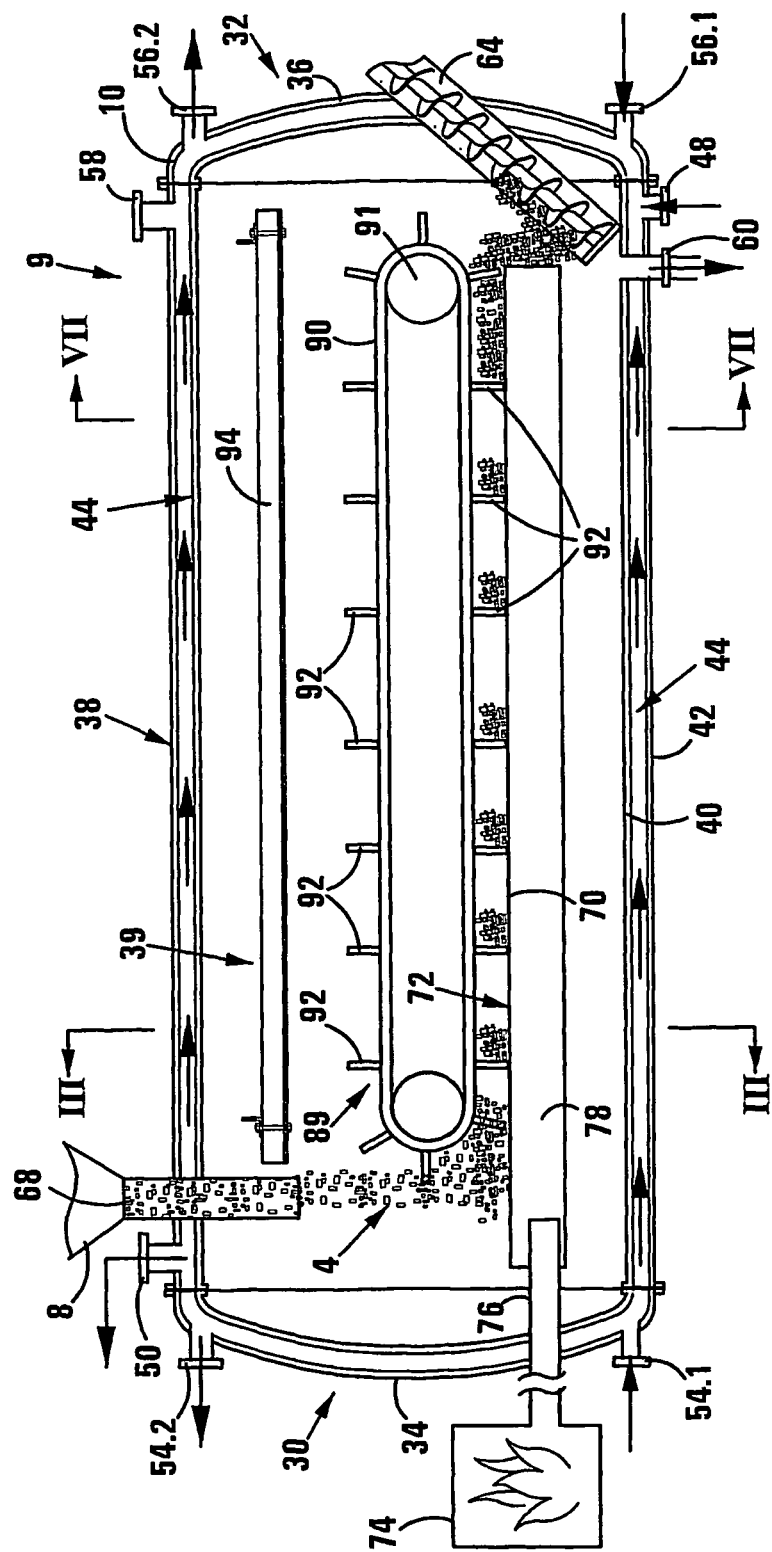
FIG. 2 shows a schematic sectional side view of a reactor in accordance with the invention, for the pyrolysis of rubber tyres.
Figure 3:
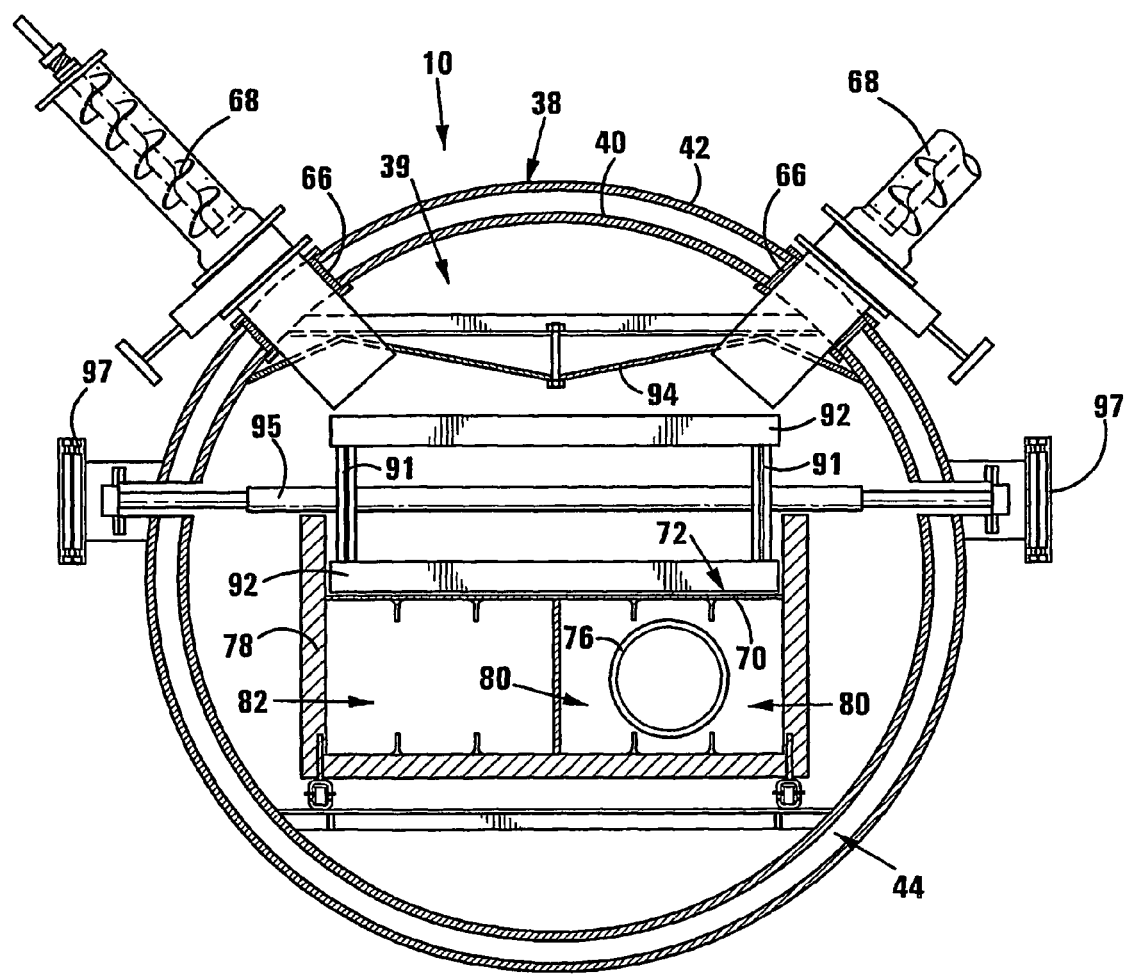
FIG. 3 shows a schematic sectional end view of the reactor of FIG. 2, sectioned along section line III-III of FIG. 2.
Figure 4:
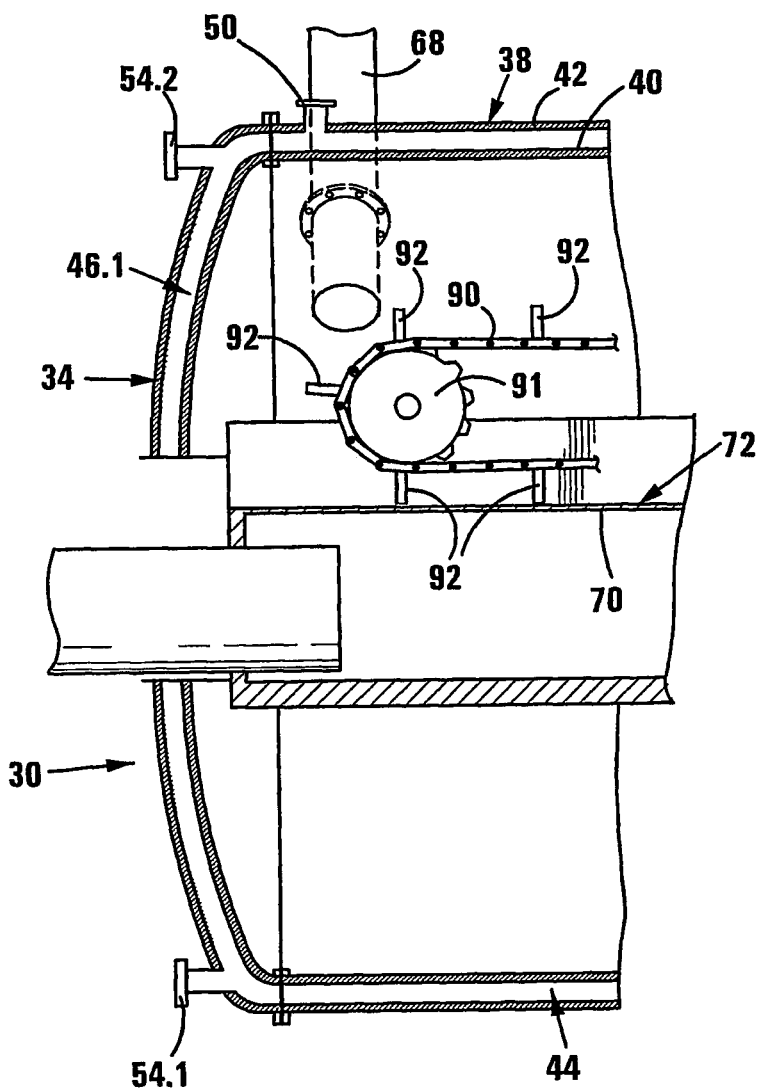
FIG. 4 shows a fragmentary schematic sectional side view of the front end of the reactor of FIG. 2.
Figure 5:
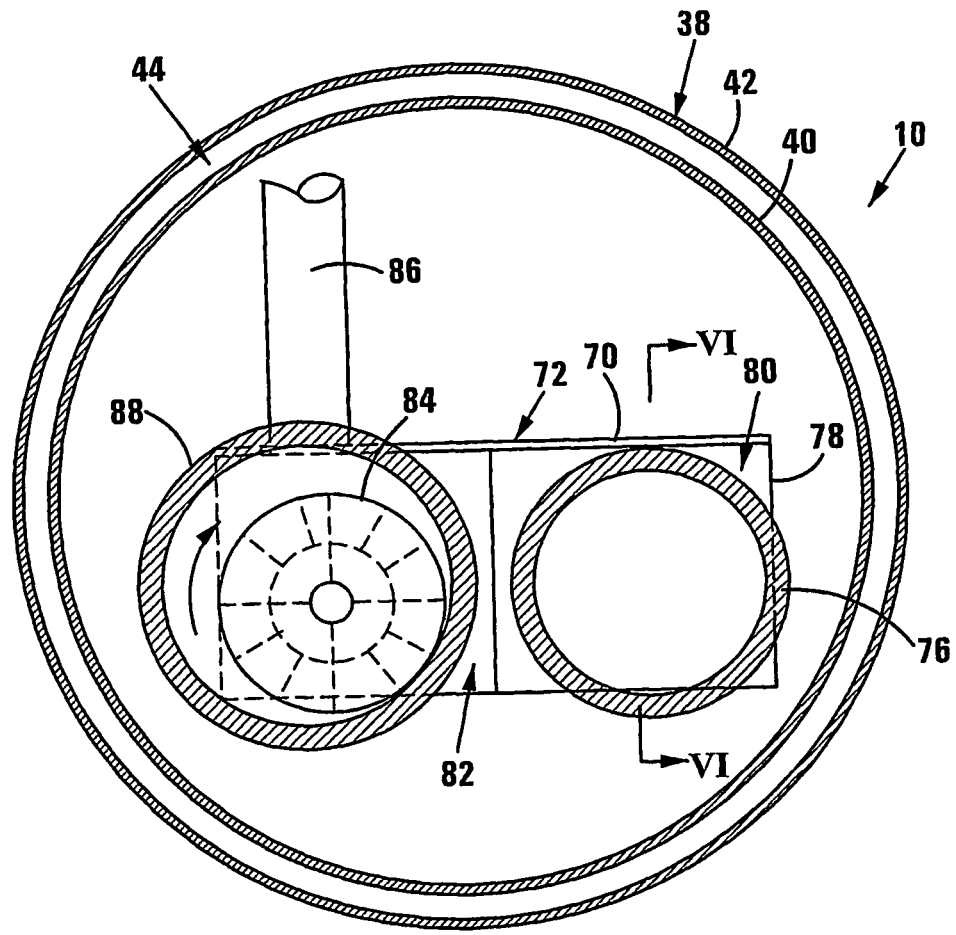
FIG. 5 shows a schematic sectional end view of the front end of the reactor of FIG. 2.
Figure 6:
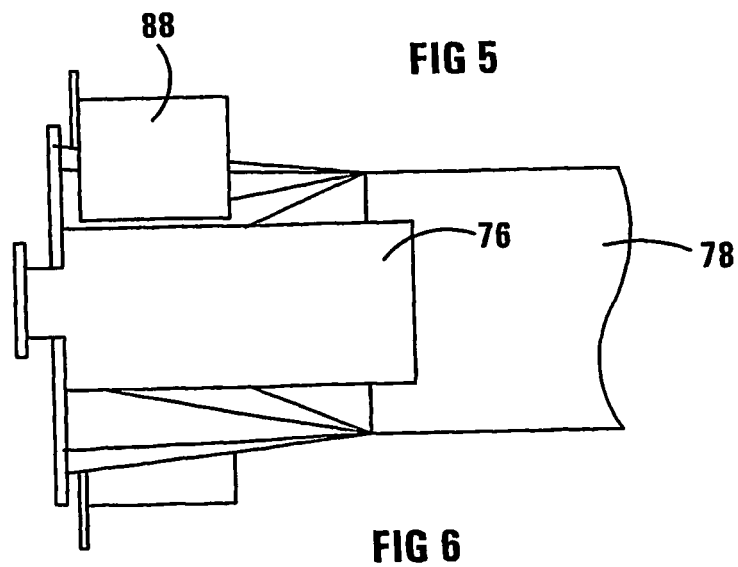
FIG. 6 shows a schematic side view of the flame tube and circulation fan of the reactor illustrated in FIG. 5, sectioned along section line VI-VI of FIG. 5.
Figure 7:
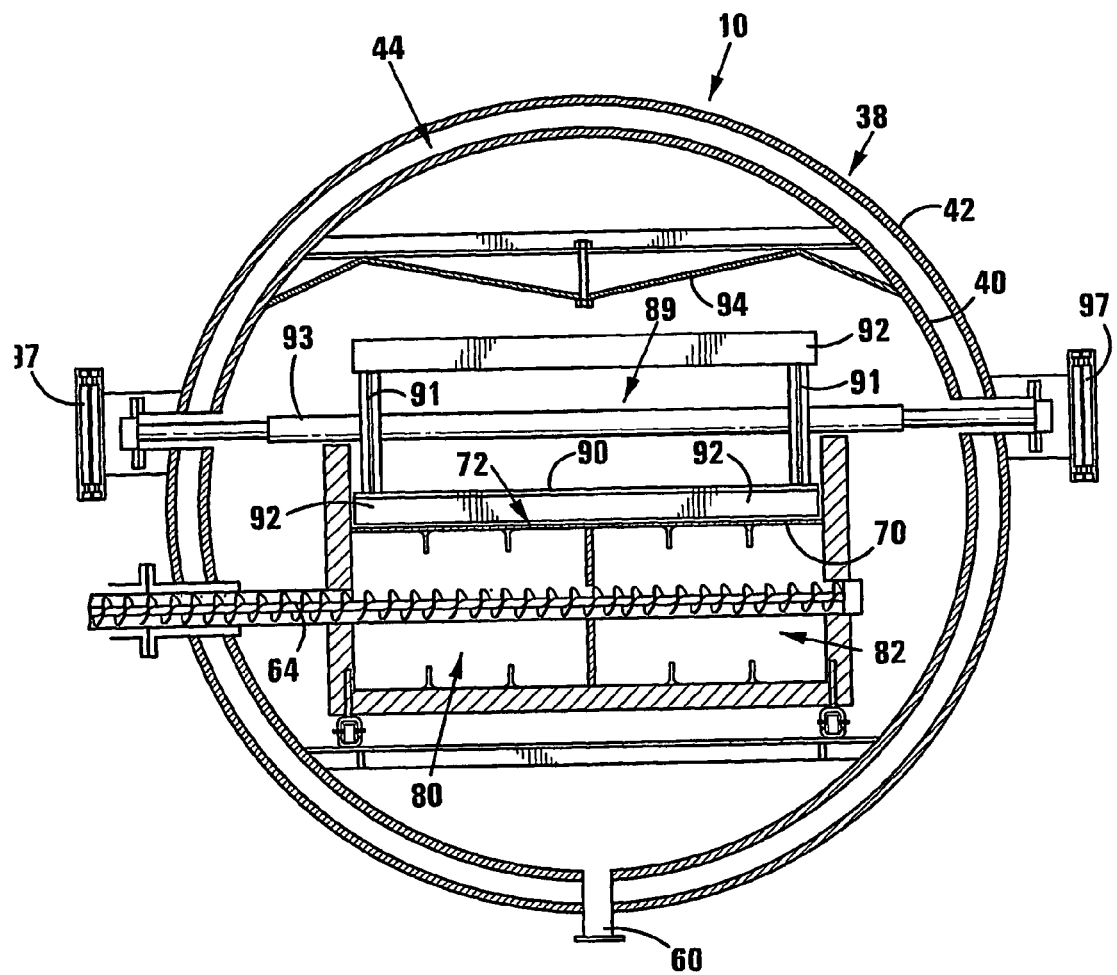
FIG. 7 shows a schematic sectional end view of the reactor of FIG. 2, sectioned along section line VII-VII of FIG. 2.
Figure 8:
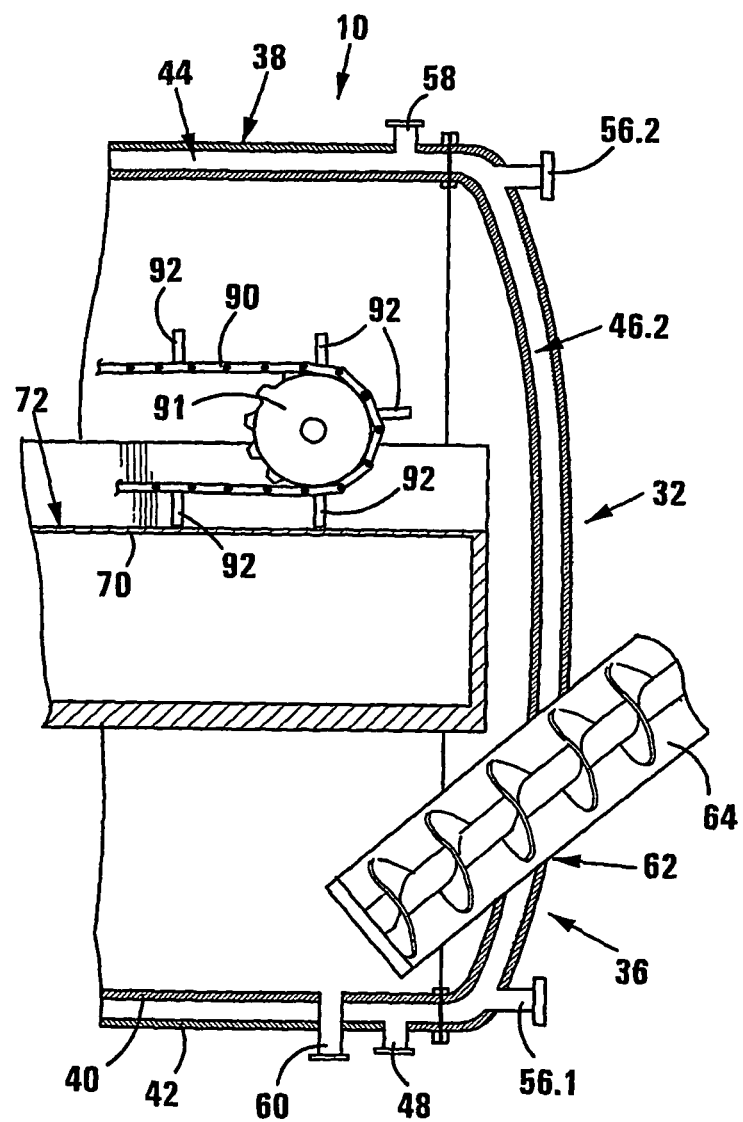
FIG. 8 shows a fragmentary schematic sectional side view of the rear end of the reactor of FIG. 2.

With reference to FIG. 1 of the drawings, an overview of a process in accordance with the inventor, for processing carbon-containing waste material in the form of rubber motor vehicle tyres, to recover commercially valuable oil and a solid residue in the form of amorphous carbon therefrom, is illustrated.

Waste rubber tyres 1 are introduced into a hopper 2 and then thereafter into a tyre chipping apparatus 3 which cuts the waste tyres into chips 4 having a size of approximately 5 mm. Steel beading wire is separated from the tyres in a separator apparatus (not shown). The rubber chips are conveyed from the tyre chipping apparatus 3 to a cyclone separator 5 which separates undersized particles from the rubber chips. The undersized particles are conveyed to a hopper 6. From the cyclone separator 5, the remaining tyre chips are fed into a hopper 7 and thereafter fed into two air-tight feed bins 8. The tyre chips are then conveyed from the feed bins 8 to a reactor 9 where the tyre chips 4 are introduced into an air-tight reactor vessel 10 in which the rubber chips are heated to a temperature sufficient to cause decomposition of the rubber into a vapour and a solid residue.

The reactor vessel 10 is connected to a vacuum scrubber 12 via a vacuum pump 14 for maintaining the air pressure within the reactor vessel at atmospheric pressure of 0.5 kPa. After decomposition in the reactor vessel 10, the carbon black residue is discharged from the reactor vessel 10 to a storage bin 16 from which the carbon black is bagged or loaded into bulk-loading containers. The vapour given off when the tyres are heated in the reactor vessel, is allowed to condense into an oil distillate. In order to provide for condensation of the vaporised gaseous product, the walls of the reactor vessel 10 are cooled by cooling water provided by a cooling tower 18 which is connected via conduits 20 to the reactor vessel. The condensed oil distillate is discharged from the reactor vessel to a collection vessel 22 and thereafter pumped by pump 23 to a separator 24 in which water and other contaminants are separated from the oil. Thereafter, the oil from which the contaminants have been separated, is stored is transferred to oil storage containers 26.

The reactor 9 is described hereinafter in further detail. The reactor vessel 10 is of fabricated mild steel and has an elongate cylindrical configuration, having a front end 30 and a rear end 32. More particularly, the reactor vessel has a front end wall structure 34 at its front end, a rear end wall structure 36 at its rear end and a cylindrical wall structure 38 extending between the first and second end wall structures. The front and rear end wall structures are bolted onto the ends of the cylindrical wall structure so as to form an air-tight reactor chamber 39 within the reactor vessel.

The cylindrical wall structure 38 includes an inner shell 40 and an outer shell 42 that is spaced from the inner shell. A cooling jacket 44 in which cooling water can flow for cooling the inner shell 40 of the reactor vessel, is defined between the inner and outer shells. Similarly, the front and rear end wall structures 34 and 36 are double wall structures which define cooling jackets 46.1 and 46.2, respectively, within which cooling water can flow. The outer shell of the cylindrical end wall structure 38 has an inlet port 48 through which cooling water from the cooling tower 18 can enter the cooling jacket 44 and an outlet port 50 through which cooling water can exit the cooling jacket to be returned to the cooling water 18. Thus, cooling water at a temperature of approximately 21° C. flows into the cooling jackets 44, 46.1 and 46.2 thereby cooling the inner sides of the wall structures. The cooling water is circulated around the vessel and returned to the cooling tower 18 in a continuous process by means of a pump 52. To allow for circulation of cooling water, the front end wall structure 34 has an inlet port 54.1 and an outlet port 54.2 through which cooling water can enter and be discharged from the cooling jacket 46.1. In similar fashion, cooling water enters the cooling jacket 46.2 through an inlet port 56.1 and flows from the cooling jacket via an outlet port 56.2 back to the cooling tower 18 for re-cooling.

The air pressure within the reactor chamber 39 of the reactor vessel 10 is maintained at a sub-atmospheric pressure of approximately 50 kPa which is also the air pressure within the feed bins 8. As such, the reactor vessel 10 has a vacuum port 58 which opens into the interior of the vessel and which is connected to the vacuum pump 14 via a pipe 60.

The reactor vessel 10 includes an oil distillate outlet 60 through which the oil distillate from the decomposed rubber chips is discharged from the reactor vessel. The rear end wall structure of the reactor vessel includes a solid residue outlet opening 62 in which a screw-conveyor 64 for conveying the carbon black from the reactor vessel to the storage vessel 16 is fitted in an air-tight arrangement. The reactor includes a cooling sleeve 65 which surrounds part of the screw-conveyor 64 and through which cooling water flows for cooling the solid residue as it is conveyed by the screw-conveyor 64. The reactor vessel further includes two spaced inlet openings 66 which are defined in an upper side of the reactor vessel near the front end thereof, in which screw-conveyors 68 are fitted. Each feed bin 8 is connected to a different one of the screw conveyors 68 for feeding tyre chips into the reactor vessel.

The reactor 9 includes a support tray 70 of fabricated mild steel that is disposed horizontally within the reactor vessel and that defines a support surface 72 for supporting a bed of the rubber chips. The support tray 70 is disposed centrally within the vessel and extends longitudinally between the front and rear ends thereof.

The reactor 9 includes heating means in the form of a heating arrangement comprising a furnace 74 which is located externally of the reactor vessel 10 and a flame tube 76 which extends into the reactor chamber through an opening in the front end wall structure 34. The reactor includes an air duct 78 for conveying air heated by the furnace through the reactor vessel 10. The air duct 78 is of mild steel and extends for the length of the reactor vessel and is integrally formed with and disposed under the support tray 70 for heating the support tray and thereby the rubber chips supported thereon via heat transfer to the support tray. The air duct 78 forms a sealed unit in which the air pressure is generally at atmospheric pressure. The air duct follows a return path and as such, has an inlet opening 80 and an outlet opening 82. More particularly, the duct extends from its inlet opening 80 to a position near the rear end of the reactor vessel and thereafter returns back towards the outlet opening 82 of the duct. The reactor includes a return pipe which extends through an opening in the front end wall structure for conveying hot air which has been circulated through the reactor vessel to the exterior of the vessel where excess air is discharged to the atmosphere via a flue 86. A circulating fan 84 circulates the hot air from the furnace along the air duct. Exposed surfaces of the air duct 78 (other than the support tray 70) are lined with a thermal insulator such as lagging. The fan 84 is housed within a cylindrical housing 88.

The reactor 9 includes a conveyor system designated generally by the reference numeral 89, for moving the bed of rubber chips along the support tray 70. The conveyor system is located within the reaction chamber of the reactor vessel above the support tray and includes a chain 90 having a plurality of horizontally-spaced transverse rake members 92 which extend across the support surface 92 of the support tray 70. the chain 90 is mounted on sprockets 91 at opposite ends thereof, which are in turn fixed to a follower shaft 93 at the rear end of the reactor vessel and a drive shaft at the front end thereof which is driven by an electric motor. The sprocket shafts 93 and 95 are mounted to opposite side of the reactor vessel by means of air-tight sealed bearings 97. The rake members are displaced along the support surface in a direction from the front end 30 to the rear end 32 of the reactor vessel, thereby displacing the rubber along the support surface. More particularly, the rake members are configured to agitate the rubber chips while displacing the rubber, thereby exposing different surfaces of the rubber chips to heat so as to increase the rate of heat transfer to the rubber chips.

The reactor vessel includes deflector means in the form of a deflector plate 94 which is spaced above the support tray 70 and which extends for the length of the reactor vessel, for deflecting the vapours towards the sides of the reactor vessel. In use, this prevents droplets of vaporised oil from falling back onto the support tray. The deflector plate is thus shaped and configured to deflect the gaseous product towards the sides of the reactor vessel.

In use, the rubber pyrolysis process is continuous, with rubber chips being continuously fed into the reactor vessel from the two feed bins 8 via the screw-conveyors 68. The rubber chips are deposited onto the support tray 70 near the front end 30 of the reactor vessel. In a typical rubber pyrolysis process, the support tray is heated to a temperature of approximately 500° C. and the conveyor is set up so as to display the rubber chips along the support surface 72 at a speed of approximately 1 m/min. As the rubber chips are conveyed along the support surface, the rubber chips are decomposed into an oil vapour and the solid residue. The oil vapour condenses when it contacts the inner shell 40 and the deflector plate 94 deflecting the oil vapour towards the sides of the reactor vessel. As such, the oil condensate runs down along the sides of the reactor vessel to the base thereof. Oil condensate is displaced to the sides of the reactor vessel by the deflector plate so as to prevent condensed oil from falling back onto the support tray where the oil would be subjected to cracking thus producing poor quality waste oil. The reactor vessel is installed so as to slope slightly towards the rear end thereof. As such, the oil distillate collects at a base region of the vessel near the oil distillate outlet opening 60 near the rear end of the reactor vessel, from which it is discharged from the reactor vessel to the collection vessel 22.

Two vacuum feed bins 8 are used so as to maintain the sub-atmospheric pressures within the feed bins while continuously feeding rubber chips to the reactor vessel. The feeding of rubber chips from the feed bins is controlled by a programmable logic controller receiving inputs from level switches in each of the two feed bins in order to control switching of the feed from an empty bin to a full bin when the level of rubber chips in the empty bin drops below a predetermined level. While one bin feeds rubber chips to the reactor vessel, the other bin can be replenished. In this manner, the partial vacuum in the feed bin feeding chips to the reactor vessel is maintained.

The invention claimed is:

1. A reactor for the pyrolysis of carbon-containing waste material, which includes:
   a reactor vessel having a first end wall structure at a first end of the reactor vessel, and a second end wall structure at a second end of the reactor vessel and a cylindrical wall structure extending between said first and second ends of the reactor vessel, the cylindrical wall structure including an inner shell and an outer shell spaced therefrom, the reactor vessel defining an air-tight reactor chamber, and having inlet means through which waste material can be introduced into the reactor chamber to be heat treated and outlet means for discharging heat treated material from the reactor chamber;
   a support tray that is disposed horizontally within the reactor chamber between the inlet means and the outlet means and that has a support surface for supporting a bed of the waste material;
   heating means for heating the bed of waste material on the support surface of the support tray, to a temperature sufficient to cause decomposition of the waste material into a gaseous product and a solid residue;
   a conveyor system for moving the bed of waste material along the support tray;
   vacuum means for forming a vacuum within the reactor chamber;
   cooling means in the form of a cooling jacket which is defined between the inner and outer shells of the cylindrical wall structure and in which a cooling medium can flow for cooling at least part of the reactor vessel thereby to provide for condensation of a portion of the gaseous product when it contacts the reactor vessel; and
   deflector means which is disposed above the support tray for deflecting the gaseous product towards sides of the reactor vessel, thereby to prevent droplets of condensed gaseous product from falling back onto the support tray.

2. The reactor as claimed in claim 1, wherein the first and second end wall structures include spaced inner and outer shells, with additional cooling jackets being defined between the inner and outer shells.

3. The reactor as claimed in claim 1, wherein the support tray is disposed centrally within the reactor vessel, extending between the first and second ends of the reactor vessel.

4. The reactor as claimed in claim 1, wherein the deflector means is in the form of a deflector plate which is shaped to deflect the gaseous product towards sides of the reactor vessel.

5. The reactor as claimed in claim 4, wherein the deflector plate is spaced from and located above the support tray.

6. The reactor as claimed in claim 1, wherein the heating means is in the form of a furnace which is disposed externally of the reactor vessel and a heat exchanger in the form of a heating conduit for conveying air heated by the furnace, into the reactor vessel, the conduit extending for the length of the reactor vessel for heating the support tray and thereby the waste material supported thereon, via heat transfer to the support tray.

7. The reactor as claimed in claim 6, wherein the conduit follows a return path wherein the conduit extends from the furnace into the reactor vessel and substantially for the length of the support tray before returning to the furnace where reheating of the air takes place, in use.

8. The reactor as claimed in claim 1, wherein the conveyor system includes a plurality of horizontally-spaced rake members which extend across the support surface of the support tray, the conveyor system being operable to displace the rake members along the support surface in a direction from the first end of the reactor vessel to the second end thereof, thereby to displace the particulate material along the support surface.

9. The reactor as claimed in claim 8, wherein the rake members are configured to alter the orientation of the waste material while displacing the waste material along the support tray, thereby to expose different surfaces of the waste material to heat so as to increase the rate of heat transfer to the waste material.

10. The reactor as claimed in claim 1, wherein the reactor vessel is adapted for processing hydrocarbon-containing waste material, the outlet means of the reactor vessel including an oil distillate opening through which condensed oil resulting from the pyrolysis of the waste material, can be discharged from the reactor vessel; and a solid residue outlet through which the solid residue can be discharged from the reactor vessel.

11. The reactor as claimed in claim 10, further comprising a solid residue screw-conveyor fitted in the solid residue outlet, which has a first end located within the reactor vessel and a second end disposed externally of the reactor vessel, for conveying solid residue from the reactor vessel to a receiving bin.

12. The reactor as claimed in claim 1, wherein the vacuum means is in the form of a vacuum pump which is connected via a vacuum conduit, to the reactor vessel for reducing the air pressure within the reactor vessel to sub-atmospheric pressures.

13. The reactor as claimed in claim 1, wherein the reactor includes a screw conveyor for conveying waste material into the reactor vessel via its inlet means, the screw-conveyor extending into the reactor vessel for depositing particulate waste material onto the support tray near the first end of the vessel.

14. A reactor vessel comprising:
a first end wall structure at a first end of the reactor vessel, and a second end wall structure at a second end of the reactor vessel and a cylindrical wall structure extending between said first and second ends of the reactor vessel, the cylindrical wall structure including an inner shell and an outer shell spaced therefrom, the reactor vessel defining an air-tight reactor chamber, and having inlet means through which waste material can be introduced into the reactor chamber to be heat treated and outlet means for discharging heat treated material from the reactor chamber;

a support tray that is disposed horizontally within the reactor chamber between the inlet means and the outlet means and that has a support surface for supporting a bed of the waste material;

an air duct disposed under the support tray for heating the support tray;

a conveyor system for moving the bed of waste material along the support tray;

an outlet through which air can be evacuated from the reactor vessel;

cooling means in the form of a cooling jacket which is defined between the inner and outer shells of the cylindrical wall structure and in which a cooling medium can flow for cooling at least part of the reactor vessel thereby to provide for condensation of a portion of the gaseous product when it contacts the reactor vessel; and deflector means which is disposed above the support tray for deflecting the gaseous product towards sides of the reactor vessel, thereby to prevent droplets of condensed gaseous product from falling back onto the support tray.

15. A process for the pyrolysis of carbon-containing waste material using a reactor for the pyrolysis of carbon-containing waste material, which includes:

a reactor vessel having a first end wall structure at a first end of the reactor vessel, and a second end wall structure at a second end of the reactor vessel and a cylindrical wall structure extending between said first and second ends of the reactor vessel, the cylindrical wall structure including an inner shell and an outer shell spaced therefrom, the reactor vessel defining an air-tight reactor chamber, and having inlet means through which waste material can be introduced into the reactor chamber to be heat treated and outlet means for discharging heat treated material from the reactor chamber;

a support tray that is disposed horizontally within the reactor chamber between the inlet means and the outlet means and that has a support surface for supporting a bed of the waste material;

heating means for heating the bed of waste material on the support surface of the support tray, to a temperature sufficient to cause decomposition of the waste material into a gaseous product and a solid residue;

a conveyor system for moving the bed of waste material along the support tray;

vacuum means for forming a vacuum within the reactor chamber;

cooling means in the form of a cooling jacket which is defined between the inner and outer shells of the cylindrical wall structure and in which a cooling medium can flow for cooling at least part of the reactor vessel thereby to provide for condensation of a portion of the gaseous product when it contacts the reactor vessel; and deflector means which is disposed above the support tray for deflecting the gaseous product towards sides of the reactor vessel, thereby to prevent droplets of condensed gaseous product from falling back onto the support tray, comprising steps of:

introducing waste material into the reactor vessel of the reactor via the inlet means thereof;

heating the support tray and thereby the waste material to a temperature sufficient to cause decomposition of the waste material into a gaseous product and a solid residue;

displacing the waste material along the support tray from the inlet means to the outlet means of the reactor vessel;

cooling at least a portion of the reactor vessel thereby to allow for condensation of the gaseous product as it contacts said portion of the reactor vessel; and collecting the resultant condensate and the solid residue.

16. The process as claimed in claim 15, wherein the waste material is a hydrocarbon-containing waste material.

17. The process as claimed in claim 16, wherein during the cooling at least a portion of the reactor vessel thereby to allow for condensation of the gaseous product as it contacts said portion of the reactor vessel oil distillate is condensed, and the condensed oil distillate runs along a side of the reactor vessel within the reactor chamber, to a position within the reactor chamber where the oil distillate can be collected and discharged from the reactor vessel.

18. The process as claimed in claim 17, further comprising deflecting the gaseous product from a position above the support tray towards the side of the reactor vessel thereby to prevent droplets of condensed oil distillate from falling back onto the support tray.

* * * * *